United States Patent Office 2,821,522
Patented Jan. 28, 1958

2,821,522

PREPARATION OF WATER-SOLUBLE SULFONATION PRODUCTS OF POLYMERIC AR-VINYL-TOLUENES

William C. Bauman, Midland, Harold H. Roth, Bay City, and Hugh B. Smith, Midland, Mich., assignors to The Dow Chemical Company, Midland, Mich., a corporaration of Delaware No Drawing. Application November 24, 1954
Serial No. 471,108

11 Claims. (Cl. 260—79.3)

This invention relates to the preparation of water-soluble sulfonates of polymeric ar-vinyltoluenes. It pertains especially to an improved method for making water-soluble resin sulfonates by reaction of sulfur trioxide sulfonation agents on polymerized ar-vinyltoluenes wherein the reaction mixture is heterogeneous and the polymeric ar-vinyltoluene reactant is in a state of very fine subdivision.

There have previously been described methods for the sulfonation of polystyrene and related polymeric and copolymeric resins whereby resin sulfonates ranging from products soluble in water to products insoluble in water are obtained. Such products which are soluble in water have been observed to vary considerably in their effect upon the properties of the watery solutions containing the same, e. g. the degree of thickening of the solution. It has been shown that, by some of the proposed methods of sulfonation, it is difficult to obtain water-soluble sulfonated products. By other methods, water-soluble sulfonates can sometimes be obtained, but the effect of such products on the properties, e. g. viscosity, of watery solutions thereof are found to vary erratically and unpredictably from one batch or run to another even when attempts are made rigidly to duplicate the conditions of the sulfonation.

It is now generally believed that the above-mentioned erratic result of sulfonation of styrene-type resins is due in part to the formation of chemical cross-linkages, e. g. sulfone linkages, between polymer molecules during the sulfonation reaction. It has been taught that the occurrence of cross-linking side reactions can be minimized by dissolving the resin starting material in an inert solvent and carrying out the sulfonation with sulfur trioxide in a very dilute reaction mixture, e. g. so that the resin sulfonic acid products is not more than 5, and usually not more than 3, percent by weight of the whole reaction mixture. A typical known procedure for accomplishing such a sulfonation is as follows. From 0.8 to 3 molecular equivalents of sulfur trioxide are admixed with one equivalent of a polystyrene resin while having the latter dissolved in carbon tetrachloride and while maintaining the mixture at reaction temperatures between —20° and 35° C., the combined weight of the sulfur trioxide and the polystyrene starting materials being such as to correspond to from 1 to 5 percent by weight of the whole reaction mixture. Other suitable solvents for the polystyrene are methylene chloride, tetrachloroethylene, ethylene dichloride and 1,1,1-trichloroethane, and the sulfur trioxide can be employed in the form of a complex compound with a suitable ether, e. g. dioxane or bis(beta-chloroethyl)ether.

This and other procedures of the prior art, by which water-soluble polystyrene resin sulfonates have been prepared, are characterized by these requirements:

(1) The polystyrene starting material is dissolved in a suitable solvent to form a solution; and (2) The reaction mixture contains such proportions of solvent-diluent that the resin sulfonic acid product is not more than about 5 percent, preferably not more than 3 percent, by weight of the entire reaction mixture.

Processes such as those just described have, however, not been entirely satisfactory, in part because of the two requirements just cited. Such processes require the time and labor of making suitable solutions of polymeric resins, require the use of large proportions of solvents, require the handling of dilute reaction mixtures, result in relatively low production efficiency for the equipment in which the sulfonation reaction is conducted and require the recovery of large proportions of solvents for reuse if these processes are to be at all practical.

It is an object of this invention to provide a method for sulfonation of a polymeric resin, whereby water-soluble polymer resin sulfonates can be obtained, without the necessity of preparing a solution of the polymeric resin starting material.

A further object is to provide such a method wherein the proportion of polymer resin sulfonic acid in the sulfonation reaction can be considerably greater than 5 percent, e. g. up to 20 or more percent by weight of the entire reaction mixture.

A more specific object is to provide such a method for sulfonation of polymeric ar-vinyltoluenes, whereby water-soluble sulfonates of polymeric ar-vinyltoluenes can be obtained, wherein a solid polymeric ar-vinyltoluene starting material is reacted with a sulfur trioxide sulfonating agent in the presence of a sulfonation-inert liquid diluent to obtain a reaction mixture containing from about 1 to about 20, advantageously from 5 to 20, percent of its weight of the polymeric ar-vinyltoluene sulfonic acid reaction product.

Other objects and advantages of the invention are evident in the following description.

The objects of this invention are attained in a method, more particularly described hereinafter, wherein a solid polymeric ar-vinyltoluene, in a very fine state of subdivision, is admixed with a liquid solution containing a sulfur trioxide sulfonation agent and a sulfonation-inert liquid diluent.

Suitable finely divided polymeric ar-vinyltoluenes for practice of this invention comprise polymer particles whose average diameters are not more than about 10 microns, preferably from about 0.05 to about 5 microns, and loosely bound aggregates of such particles, the average diameters of such aggregates being not more than about 15 microns, e. g. from about 1 to about 15 microns. The polymer particles referred to can be generally rounded particulate masses characteristically formed by emulsion polymerization and having a nearly spherical shape. For these particles, the term "diameter" has its customary meaning. The aggregates of these particles resemble clusters of grapes and are often irregular in shape. For such an aggregate, the term "diameter" expresses the overall size of the aggregate cluster in terms of the diameter of a sphere having approximately the same volume as that of the cluster. Suitable polymer particles can be ground or crushed particles having irregular shapes. For such particles, the term "diameter" is taken to mean the approximate mean straight line dimension through the center of the particle.

Such finely divided polymeric ar-vinyltoluenes can be made by known methods, e. g. by grinding or crushing larger masses of solid polymer, by atomizing liquid solutions of the polymer and by atomizing the molten polymer. A particularly satisfactory procedure for obtaining the finely divided polymer solid required for the present sulfonation process is to polymerize a polymerizable composition comprising monomeric ar-vinyltoluene while dispersed in an aqueous medium to produce a stable colloidal dispersion of the polymeric resin and thereafter to separate from the dispersion a dry, aggregated polymer solid in the form of extremely small particles as herein specified.

Suitable methods are already known for polymerizing monomeric ar-vinyltoluene in aqueous emulsion to produce stable suspensions of colloidally dispersed polymer particles having average diameters of less than about 1.0 micron, e. g. from 0.05 to 0.5 micron. Also, already known are suitable methods for treating such colloidal dispersions so as to obtain therefrom dry, aggregated polymer solids containing polymer particles of a kind just stated in the form of aggregates whose average diameters are not greater than 15 microns, e. g. from about 1 to about 15 microns. Such a dry, aggregated polymer solid can be obtained from a suitable dispersion in the usual manner by coagulating the dispersed particles e. g. by freezing or by addition of electrolytes, separating the coagulum from the aqueous serum, and drying the coagulum. Preferably, a dry, aggregated polymer solid, suitable for use in the process of this invention, is obtained by spray-drying a suitable aqueous dispersion by already known procedures.

Solid polymer particles and aggregates of particles within the range of size just specified can readily be sulfonated by the method herein described to produce water-soluble polymer sulfonates. Attempts to employ polymer particles and aggregates of particles substantially larger than those specified usually result in the formation of polymer sulfonates which are at least partially insoluble, or only swollen, in water, probably because of incomplete sulfonation of the interior of large masses of polymer or because of a greater degree of cross-linking reaction.

The polymerized ar-vinyltoluenes to which this invention is preferably applied are polymeric resins containing, in chemically combined form, a predominate proportion, e. g. 60 or more percent by weight, of at least one ar-vinyltoluene, i. e. a nuclear methyl styrene, such as o-vinyltoluene, m-vinyltoluene, and p-vinyltoluene. The polymer can consist essentially of one such ar-vinyltoluene or can be a polymer of two or more of the isomeric ar-vinyltoluenes. The polymerized ar-vinyltoluene can also contain, chemically combined therein, a minor proportion, e. g. up to about 40 percent by weight, of one or more of other polymerizable compounds such as styrene, alpha-methylstyrene and other alkenylaromatic compounds, methyl methacrylate, ethyl acrylate and other esters of acrylic and methacrylic acids, maleic anhydride, acrylonitrile, methacrylonitrile, vinyl esters, vinyl halides, vinylidene halides, vinyl ethers, vinyl ketones and olefins such as ethylene and isobutylene. The polymers must be soluble in usual polymer solvents such as toluene, dioxane or methyl ethyl ketone, and substantially free of chemical cross-linkages.

The sulfur trioxide sulfonation agent employed can be sulfur trioxide, per se, a solution thereof in a suitable inert solvent, or a complex of sulfur trioxide, e. g. with dioxane, thioxane, or bis-(beta-chloroethyl)ether, capable of generating sulfur trioxide in situ and effecting sulfonation of the benzene rings of the polymeric ar-vinyltoluene.

Suitable diluents which can be used as media for the sulfonation are the already known organic and inorganic liquids which are substantially inert to chemical reaction with sulfur trioxide under conditions for sulfonation of the polymer and which are capable of at least swelling the polymer particles. By this last requirement is meant that the polymer particles be capable of imbibing the liquid diluent thereby causing the polymer particles to at least swell and usually to form a homogeneous liquid mixture with the diluent. This is not to say that the polymer particles are actually dissolved by such suitable liquid media during the sulfonation reaction in the manner of this invention. The sulfonation of the extremely fine particles of solid polymer, to produce a resin sulfonate product which is insoluble in the sulfonation reaction mixture, occurs so rapidly that the polymer particles are prevented from dissolving in the liquid reaction mixture, even though the polymer starting material is ordinarily soluble in the liquid diluent alone in the absence of the sulfonation agent. Liquids which are not imbibed by the polymer to cause swelling or solution thereof are not suitable per se as media of sulfonation by the present method, although mixtures of such non-swelling liquids with liquids which are imbibed by the polymer can be used provided that the mixture of such liquids is capable of being imbibed by the polymer to cause swelling or solution thereof. A suitable test to determine suitability of a liquid diluent proposed as a medium for sulfonation is to suspend a quantity of the finely divided polymer starting material in nine or more times its weight of the liquid to be tested, preferably at the temperature at which a sulfonation reaction is to be carried out, and to shake or stir the resulting suspension. A liquid which causes noticeable swelling of the polymer particles, the formation of a gel or a homogeneous liquid layer of the polymer, or a true or colloidal solution thereof, is a suitable medium for the sulfonation of that polymer in the present method, provided that the liquid is also substantially inert to chemical reaction with sulfur trioxide under conditions for sulfonation of the polymer as herein described.

Examples of liquids meeting the tests just described and usually preferred as media for the sulfonation of polymers of ar-vinyltoluene by the present method are liquid sulfur dioxide, liquid chlorinated aliphatic hydrocarbons such as liquified methyl chloride, methylene chloride, carbon tetrachloride, ethylene chloride, tetrachloroethylene, mixtures of two or more of such chlorinated aliphatic hydrocarbons and mixtures of liquid sulfur dioxide with one or more of such chlorinated aliphatic hydrocarbons. Liquid sulfur dioxide and mixtures containing a predominate proportion of sulfur dioxide are usually preferred because sulfonations carried out in such media are most readily reproduced, and substantially uniform products are obtained from a given polymer starting material from one run to another. Liquids, such as 1,2,3,4-tetrachloro-1,1,2,3,4,4-hexafluorobutane, which are chemically resistant to sulfur trioxide, but are not capable of swelling polymeric ar-vinyltoluene, can nevertheless be employed as part of the sulfonation liquid diluent medium in admixture with one of the preferred liquid diluents just described in proportion such that the resulting mixture is capable of satisfying the test for swelling of the polymer starting material.

In practice of the invention, a suitable finely divided polymeric ar-vinyltoluene of the kind hereinbefore described is admixed with a liquid solution of one of the aforementioned sulfur trioxide sulfonation agents and one of the sulfonation-inert liquid diluents at a reaction temperature between about $-20°$ C. and about $+40°$ C. with vigorous agitation. Usually, the finely divided polymer solid is fed slowly into the reaction mixture containing the sulfur trioxide sulfonation agent, or the finely divided polymer and the sulfur trioxide sulfonation agent are fed concurrently to the reaction zone. In the latter procedure, the sulfur trioxide sulfonation agent is preferably diluted with at least a portion of the inert liquid diluent and the reactants, i. e., the finely divided polymer starting material and the sulfonation agent, are fed to a reaction zone containing a portion of the inert liquid diluent or a portion of the sulfonation reaction mixture. The process can be made continuous by withdrawing a portion of the sulfonation reaction mixture while continuing to feed the polymer starting material and the sulfonation agent to the reaction zone.

The dry, finely divided polymer solid starting material can be sprinkled slowly onto the surface of the liquid reaction mixture or be suspended in a chemically inert, non-solvent gas such as dry air or nitrogen and be blown into the sulfonation reaction mixture. The dry, finely divided polymer solid can also be suspended in a chemically inert liquid, such as one of the inert liquid diluents aforementioned as suitable for use in media for sulfonation, and the resulting suspension be added to the sulfonation reaction mixture. If such a suspending liquid is a swelling or solubilizing agent for the polymer, the suspension must be prepared under such conditions and utilized so promptly after preparation that no appreciable swelling or solution of the polymer is permitted to occur before the polymer is subjected to the sulfonation reaction. If the suspending liquid is a non-swelling and non-solubilizing agent for the polymer starting material, no particular haste is necessary to complete the sulfonation reaction, but it is necessary in such instances that the sulfonation reaction mixture also contain a liquid swelling or solubilizing agent for the polymer starting material. For example, a water-soluble resin sulfonate can be obtained by adding a slurry of finely divided polymeric ar-vinyltoluene in liquid 1,2,3,4-tetrachloro-1,1,2,3,4,4-hexafluorobutane to a liquid solution of liquid sulfur trioxide in liquid sulfur dioxide under sulfonation reaction conditions.

When using liquid sulfur dioxide as the reaction medium, it is convenient to carry out the process at a temperature of about −10° C., i. e., at the atmospheric boiling point of sulfur dioxide, under reflux. When using a polychlorinated aliphatic hydrocarbon medium for the reaction or when using sulfur dioxide as a medium under pressure, the reaction can be carried out at temperatures up to about 40° C., although it is usually desirable to operate at or below room temperature, e. g. from about −20° to about +25° C., in order to obtain a sulfonated polymer having the least degree of cross-linkages such as sulfone cross-linkages. Although it is usually preferable to operate at atmospheric pressure, the reaction can be carried out at higher pressures in closed systems, if desired.

The sulfur trioxide sulfonation agent and polymeric ar-vinyltoluene are used in such amounts as correspond to at least 0.7, usually from 0.7 to about two, molecular proportions of sulfur trioxide for each molecular proportion of monomeric compound chemically combined in the polymer, although the molecular ratio of sulfur trioxide to monomeric compound in the polymer can be as large as desired, e. g., ten or more. There is thereby formed a polymeric ar-vinyltoluene sulfonic acid in which there are an average of from about 0.7 to 2 sulfonic acid groups per benzene nucleus.

The amount of inert liquid diluent, e. g. sulfur dioxide, chlorinated aliphatic hydrocarbon or mixture, which is usually employed is such as corresponds to from 70 to 99, preferably from 80 to 99, percent by weight of the whole reaction mixture, i. e. so that the combined weight of the polymeric ar-vinyltoluene and sulfur trioxide corresponds to from 1 to 30, preferably from 1 to 20, percent of the whole reaction mixture.

The polymeric ar-vinyltoluene can be added to the reaction mixture as rapidly as desired, provided that good dispersion of the polymeric solid into the liquid medium is obtained. Usually it is preferred to feed the polymer starting material slowly, e. g. over a period of from one-half hour to several hours, in order to avoid the formation of large clumps of solid matter in the reaction mixture. As mentioned hereinbefore, sulfonation of the extremely fine particles of solid polymer, to produce a resin sulfonate product which is insoluble in the sulfonation reaction mixture, occurs so rapidly that the polymer particles are prevented from dissolving in the liquid reaction mixture, even though the polymer starting material is ordinarily soluble in the liquid diluent alone in the absence of the sulfonation agent. After the complete addition of the polymer starting material to the sulfonation agent, it is preferable to allow the resulting mixture to stand, with continued agitation, for a time such as from one-half hour to one hour or more before separating out the polymer sulfonate.

The sulfonation of polymeric ar-vinyltoluene as just described results in a suspension of small granules of solid polymeric resin sulfonate in a liquid medium. This suspension can be separated in usual ways, such as by filtering or centrifuging, and the solid washed with a fresh portion of the inert liquid diluent used in the reaction or with a different inert liquid such as ether, and dried in the usual manner, preferably under vacuum.

The sulfonated ar-vinyltoluene resin products so obtained are water-soluble acids which can be employed as such or converted into water-soluble salts by reaction with alkalies such as ammonia, amines and alkali metal bases, e. g. sodium hydroxide and potassium hydroxide. Uses for such polymer sulfonates are known, such as in treatment of textile, in the preparation of dispersions and emulsions, and in conditioning of agricultural soils.

The following examples illustrate the invention, but should not be construed as limiting its scope. In the examples, parts and percentages are by weight unless otherwise noted.

*Example 1*

Into a liquid solution consisting of 400 mls. of liquid sulfur dioxide and 56 mls. of liquid sulfur trioxide, at a temperature of −10° C. under reflux, was slowly sprinkled 75 grams of finely divided, dry, solid polymeric ar-vinyltoluene with vigorous agitation. This polymer starting material was obtained by spray-drying at a temperature of about 90° C. an aqueous dispersion of polymerized ar-vinyltoluene. The finely divided solid was shown by electron microscope examination to comprise extremely small spheroidal beads having average diameters of about 0.41 micron, the beads being generally gathered into custers or aggregates having average diameters of from 4 to 12 microns. A portion of the dry solid polymerized ar-vinyltoluene was dissolved in nine times its weight of toluene to form a solution having a viscosity at 25° C. of 24.2 centipoises.

After complete addition of the solid polymer starting material, requiring 35 minutes, stirring of the reaction mixture was continued for one hour. The solid sulfonate was collected on a filter, washed with ether and dried under vacuum. A one-gram portion of the dry polymer sulfonic acid was dissolved in water and titrated to neutrality with 4.6 mls. of 1.0 N sodium hydroxide solution. A portion of the neutral salt solution, diluted to a concentration of 0.5 percent of the sodium polymer sulfonate, had a viscosity at 25° C. of 26 centipoises.

*Example 2*

Into a liquid solution consisting of 300 mls. of methylene chloride (previously purified by treatment with concentrated sulfuric acid and distilled) and 10 mls. of dissolved liquid sulfur trioxide, at room temperature with vigorous agitation, was slowly sprinkled 14 grams of another portion of the spray-dried, emulsion polymerized polymeric ar-vinyltoluene described in Example 1. The addition of the solid polymer starting material required 5 minutes and stirring was continued for 30 minutes thereafter. The reaction mixture was filtered, the solid polymer sulfonate was washed with ether and dried under vacuum. The viscosity of a 0.5 percent solution of the neutral sodium salt of the polymer sulfonic acid in water at 25° C. was 140 centipoises.

*Example 3*

Into a solution of 28 mls. of bis(beta-chloroethyl)-ether in 400 mls. of liquid sulfur dioxide, at a temperature of −10° C. under reflux with agitation, was slowly added 10 mls. of liquid sulfur trioxide, thereby forming in solution a complex compound of sulfur trioxide and bis(beta-chloroethyl)ether. Into the resulting solution was slowly admixed 20 grams of finely divided, dry, solid polymeric ar-vinyltoluene. The polyvinyltoluene had been obtained by spray drying at a temperature of about 90° C. an aqueous dispersion of polymerized ar-vinyltoluene. The dry solid comprised polymer beads having average diameters of about 0.4 micron clustered into aggregates having average diameters of from 1 to 5 microns. A portion of the dry solid polymerized ar-vinyltoluene was dissolved in nine times its weight of toluene to form a solution having a viscosity at 25° C. of 17.09 centipoises.

The addition of solid polymerized ar-vinyltoluene to the sulfonation reaction mixture required 7 minutes and agitation was continued for one hour thereafter. The resulting reaction mixture, a slurry of solid granules in a liquid medium, was filtered and the solid polymer sulfonic acid was washed with ether and dried under vacuum. A one-gram portion of the dry polymer sulfonic acid was dissolved in water and neutralized with 4.6 mls. of 1.0 N sodium hydroxide solution. A portion of the neutral salt solution, diluted to a concentration of 0.5 percent of sodium polymer sulfonate, had a viscosity at 25° C. of 8 centipoises.

*Example 4*

Into a liquid solution consisting of 400 mls. of liquid sulfur dioxide and 3.6 mls. of liquid sulfur trioxide, at a temperature of −10° C. under reflux, was slowly added 5 grams of dry polymerized ar-vinyltoluene with agitation. The polymer solid was a finely divided material obtained by coagulating by freezing an aqueous dispersion of polymerized ar-vinyltoluene, thawing the frozen material, filtering, washing and drying the solid in usual manner. A portion of the dry solid polymerized ar-vinyltoluene dissolved in nine times its weight of toluene to form a solution whose viscosity at 25° C. was 150 centipoises.

The addition of solid polymerized ar-vinyltoluene to the sulfonation agent required ten minutes, after which stirring was continued for 65 minutes. The solid was filtered from the slurry, washed with diethyl ether and dried under vacuum. A one-gram portion of the purified dry resin sulfonic acid dissolved in water required 5 mls. of 1.0 N sodium hydroxide solution for neutralization. The neutral salt solution, adjusted to a concentration of 0.5 percent sodium resin sulfonate, had a viscosity at 25° C. of 620 centipoises.

*Example 5*

Into a liquid solution consisting of 300 mls. of liquid sulfur dioxide and 5.1 mls. of sulfur trioxide at a temperature of −10° C. under reflux was slowly added, with agitation, 7.1 grams of dry polymerized ar-vinyltoluene. The polymer solid was finely divided material obtained by coagulating an aqueous stable dispersion of polymerized ar-vinyltoluene by adding thereto, with vigorous agitation, an aqueous sodium chloride solution. The coagulum was separated by filtration, washed with water and dried. A portion of the dry solid polymer dissolved in nine times its weight of toluene to form a solution whose viscosity at 25° C. was 1192 centipoises.

After the addition of the solid polymerized ar-vinyltoluene to the sulfonation agent, requiring ten minutes, stirring was continued for 65 minutes. The resulting slurry was filtered and the solid was washed with diethyl ether and dried in vacuum. A one-gram portion of the dried solid sulfonic acid in water solution required 4.5 mls. of 1.0 N sodium hydroxide to effect neutralization. The viscosity of a solution of 0.5 percent of the neutral sodium resin sulfonate in water at 25° C. was 8,900 centipoises.

*Example 6*

A copolymer of 96 percent ar-vinyltoluene and 4 percent acrylonitrile was prepared by polymerizing the corresponding monomers in aqueous emulsion and the resulting stable dispersion was spray-dried to form a finely divided solid. A portion of this solid dissolved in nine times its weight of toluene to form a solution whose viscosity at 25° C. was 80 centipoises.

Fifty grams of the finely divided solid copolymer just described was slowly added over 15 minutes with agitation to a liquid solution consisting of 500 mls. of liquid sulfur dioxide and 30 mls. of liquid sulfur trioxide at a temperature of −10° C. under reflux. Agitation was continued for two hours, after which the slurry was filtered and the solid sulfonate was washed with diethyl ether and dried under vacuum. One gram of the dry resin sulfonic acid in water solution required 4.8 mls. of 1.0 N sodium hydroxide for neutralization. A water solution of 0.5 percent of the neutral sodium resin sulfonate at 25° C. had a viscosity of 37 centipoises.

*Example 7*

A finely divided solid polymer resin was obtained by spray-drying an aqueous dispersion of a copolymer of 90 percent ar-vinyltoluene and 10 percent methyl methacrylate. A ten percent solution of this copolymer starting material in toluene at 25° C. had a viscosity of 358.2 centipoises.

Twelve grams of this finely divided, spray-dried copolymer solid was added over a three minute period with agitation to a liquid solution consisting of 260 mls. of sulfur dioxide and 7.2 mls. of sulfur trioxide at a temperature of −10° C. under reflux. Agitation of the reaction mixture was continued for 30 minutes, after which the slurry was filtered, and the collected solid was washed with diethyl ether and dried under vacuum. One gram of the dry resin sulfonic acid in water solution required 4.4 mls. of 1.0 N sodium hydroxide to effect neutralization. The viscosity of a 0.5 percent solution of the neutral sodium resin sulfonate in water at 25° C. was 15 centipoises.

*Example 8*

A finely divided solid polymer resin was obtained by spray-drying an aqueous dispersion of polymeric ar-vinyltoluene, the dried product having ultimate particles of 0.3 to 0.4 micron diameter and aggregates of 1 to 5 microns average apparent diameter. A solution of one part of the resin starting material in nine parts of toluene at 25° C. had a viscosity of 17 centipoises.

A slurry was made of 15 grams of the finely divided solid polymer of ar-vinyltoluene just described and 25 mls. of 1,2,3,4-tetrachloro-1,1,2,3,4,4-hexafluorobutane and the resulting slurry was added over a period of several minutes to a liquid solution of 8.1 mls. liquid sulfur trioxide and 400 mls. of liquid sulfur dioxide at about −10° C. with very vigorous agitation.

The sulfonated resin was collected, washed with ether and dried in vacuo. The resin sulfonic acid was soluble in water and one gram of the purified resin sulfonic acid in water solution required 4.6 mls. of 1.0 N sodium hydroxide solution to effect neutralization. A water solution of 0.5 percent of the neutral sodium resin sulfonate at 25° C. had a viscosity of 9 centipoises.

In all of the foregoing examples, the inert liquid media in which the sulfonations were carried out were capable of swelling or dissolving the solid polymer starting materials, although the sulfonation reactions were carried out so rapidly that the polymer solids were not actually dissolved in the reaction media. In Example 8, a fluoro compound which was not a swelling agent for the polymer starting material was used to prepare a slurry of that polymer, but in the sulfonation reaction mixture sufficient liquid sulfur dioxide was employed to form a mixed diluent of such composition as to be capable of swelling the polymer starting material.

In contrast to these examples, a test was made in which a slurry of 25 grams of finely divided solid polymer of ar-vinyltoluene in 100 mls. of the 1,2,3,4-tetrachloro-1,1,2,3,4,4-hexafluorobutane was added at room temperature to a solution of 16 mls. of liquid sulfur trioxide in 400 mls. of the 1,2,3,4-tetrachloro-1,1,2,3,4,4-hexafluorobutane. The finely divided solid polymer starting material was another portion of the same starting material used in Example 8. In this test the entire inert liquid medium of sulfonation was a non-swelling agent for the polymer. The sulfonated resin product was collected, washed and dried in the usual fashion. The sulfonated resin was insoluble in water. Although one gram of the resin sulfonic acid, suspended in water, required 4.1 mls. of 1.0 N sodium hydroxide to effect neutralization and thereby evinced a substantial degree of sulfonation, the neutral sodium resin sulfonate was so insoluble in water that no appreciable increase in viscosity of the water was observed. The resin sulfonate appeared to be very highly cross-linked.

We claim:

1. A method for the preparation of water-soluble sulfonates, which method comprises admixing, at a sulfonation reaction temperature between −20° and +40° C. and with agitation, in the presence of an inert liquid diluent, a sulfur trioxide sulfonation agent selected from the group consisting of sulfur trioxide and ether complexes of sulfur trioxide, and a dry solid polymer of ar-vinyltoluene in a finely divided form consisting essentially of particles having average diameters not greater than about 10 microns and aggregates of such particles, the average diameter of such aggregates being not greater than about 15 microns, in amounts corresponding to at least 0.7 molecular proportion of sulfur trioxide for each molecular proportion of monomeric compound chemically combined in the polymer, said polymer being soluble and substantially free of cross-linkages and containing at least 60 percent by weight of at least one ar-vinyltoluene chemically combined therein, said inert liquid diluent being capable of at least swelling the particles of said solid polymer starting material.

2. A method according to claim 1 wherein the dry solid polymer of ar-vinyltoluene in finely divided form is obtained from a stable aqueous dispersion of that polymer.

3. A method according to claim 2 wherein the dry solid polymer of ar-vinyltoluene in finely divided form is obtained by spray-drying a stable aqueous dispersion of that polymer.

4. A method according to claim 1 wherein the inert liquid diluent is liquid sulfur dioxide.

5. A method according to claim 1 wherein the combined weight of sulfur trioxide in the sulfur trioxide sulfonation agent and the dry solid polymer of ar-vinyltoluene is from about 5 to about 20 percent of the weight of the entire reaction mixture.

6. A method according to claim 1 wherein the operations are carried out by adding the dry solid polymer of ar-vinyltoluene in finely divided form to a liquid solution containing the sulfur trioxide sulfonation agent and the inert liquid diluent.

7. A method according to claim 1 wherein the operations are carried out by adding the dry solid polymer of ar-vinyltoluene in finely divided form concurrently with a liquid solution containing the sulfur trioxide sulfonation agent and the inert liquid diluent to a reaction zone initially containing a portion of the inert liquid diluent.

8. A continuous method according to claim 1 wherein a portion of the resulting reaction mixture is continuously withdrawn from the reaction zone while feeding of the dry solid polymer of ar-vinyltoluene and the liquid solution containing the sulfur trioxide sulfonation agent and the inert liquid diluent to the reaction zone is continued.

9. A method for the preparation of water-soluble sulfonates, which method comprises admixing, at a sulfonation reaction temperature between −20° and +40° C. and with agitation, in the presence of an inert liquid diluent, a sulfur trioxide sulfonation agent selected from the group consisting of sulfur trioxide and ether complexes of sulfur trioxide, and a dry solid polymer of ar-vinyltoluene in a finely divided form consisting essentially of particles having average diameters not greater than about 1.0 micron and aggregates of such particles, the average diameter of such aggregates being not greater than about 15 microns, in amounts corresponding to at least 0.7 molecular proportion of sulfur trioxide for each molecular proportion of monomeric compound chemically combined in the polymer, said polymer being soluble and substantially free of cross linkages and containing at least 60 percent by weight of at least one ar-vinyltoluene chemically combined therein, said inert liquid diluent being capable of at least swelling the particles of said solid polymer starting material.

10. A method according to claim 9 wherein the inert liquid diluent is liquid sulfur dioxide.

11. A method according to claim 10 wherein the combined weight of sulfur trioxide in the sulfur trioxide sulfonation agent and the dry solid polymer of ar-vinyltoluene is from about 5 to about 20 percent of the weight of the entire reaction mixture.

References Cited in the file of this patent

UNITED STATES PATENTS

| | | |
|---|---|---|
| 2,283,236 | Soday | May 19, 1942 |
| 2,500,149 | Boyer | Mar. 14, 1950 |